US012610404B2

(12) United States Patent
Abdelmalek et al.

(10) Patent No.: US 12,610,404 B2
(45) Date of Patent: *Apr. 21, 2026

(54) METHOD AND SYSTEM FOR UPLINK CLASSIFIER AND BRANCHING POINT SERVICE

(71) Applicant: Verizon Patent and Licensing Inc., Basking Ridge, NJ (US)

(72) Inventors: Yousef Abdelmalek, New Providence, TX (US); Maqbool Chauhan, Keller, TX (US); Jerry Steben, Fort Worth, TX (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,807

(22) Filed: Jan. 4, 2024

(65) Prior Publication Data

US 2024/0147548 A1 May 2, 2024

Related U.S. Application Data

(63) Continuation of application No. 17/357,412, filed on Jun. 24, 2021, now Pat. No. 11,903,042.

(51) Int. Cl.
*H04W 4/00* (2018.01)
*H04W 64/00* (2009.01)
*H04W 76/10* (2018.01)
*H04W 76/20* (2018.01)
*H04W 80/12* (2009.01)
*H04W 84/18* (2009.01)

(52) U.S. Cl.
CPC ........... *H04W 76/10* (2018.02); *H04W 64/00* (2013.01); *H04W 76/20* (2018.02); *H04W 80/12* (2013.01); *H04W 84/18* (2013.01)

(58) Field of Classification Search
CPC ..... H04W 76/10; H04W 64/00; H04W 76/20; H04W 80/12; H04W 84/18
See application file for complete search history.

(56) References Cited

U.S. PATENT DOCUMENTS

| | | | |
|---|---|---|---|
| 2005/0169185 | A1 | 8/2005 | Qiu et al. |
| 2019/0357081 | A1* | 11/2019 | Gottardi ................... H04L 45/28 |
| 2020/0100303 | A1* | 3/2020 | Sankar ................... H04W 76/11 |
| 2021/0092018 | A1* | 3/2021 | Fang ........................ H04L 41/28 |
| 2022/0200813 | A1* | 6/2022 | Thiebaut ............. H04L 12/1407 |
| 2022/0353337 | A1 | 11/2022 | Huang |

* cited by examiner

*Primary Examiner* — Omoniyi Obayanju

(57) ABSTRACT

A method, a device, and a non-transitory storage medium are described in which an uplink classifier and branching point service is provided. The service may include the management of user plane function devices or uplink classifier devices according to various architectures and connectivity among the user plane function devices or uplink classifier devices. The service may allow end devices situated in different locations to connect to different application service host devices and application service layer networks based on such management.

20 Claims, 14 Drawing Sheets

500

RECEIVE A REQUEST
505

EVALUATE REQUEST
510

ADD UPF?
515

YES                    NO

SELECT ONE OF MULTIPLE
ARCHITECTURES
525

GENERATE AND TRANSMIT A
RESPONSE
520

INSERT UPF
530

GENERATE AND TRANSMIT A
RESPONSE
535

METHOD AND SYSTEM FOR UPLINK CLASSIFIER AND BRANCHING POINT SERVICE

CROSS REFERENCE TO RELATED APPLICATION

This patent application is a continuation of U.S. patent application Ser. No. 17/357,412 entitled "METHOD AND SYSTEM FOR UPLINK CLASSIFIER AND BRANCHING POINT SERVICE" and filed on Jun. 24, 2021, the disclosure of which is incorporated by reference herein in its entirety.

BACKGROUND

Development and design of networks present certain challenges from a network-side perspective and an end device perspective. For example, Next Generation (NG) wireless networks, such as Fifth Generation New Radio (5G NR) networks are being deployed and under development. The development and design of a 5G NR network may include increasing data transfer rates, increasing spectral efficiency, improving coverage, reducing latency, and enhancing end user application services for end devices, for example.

DETAILED DESCRIPTION

Figure 1:
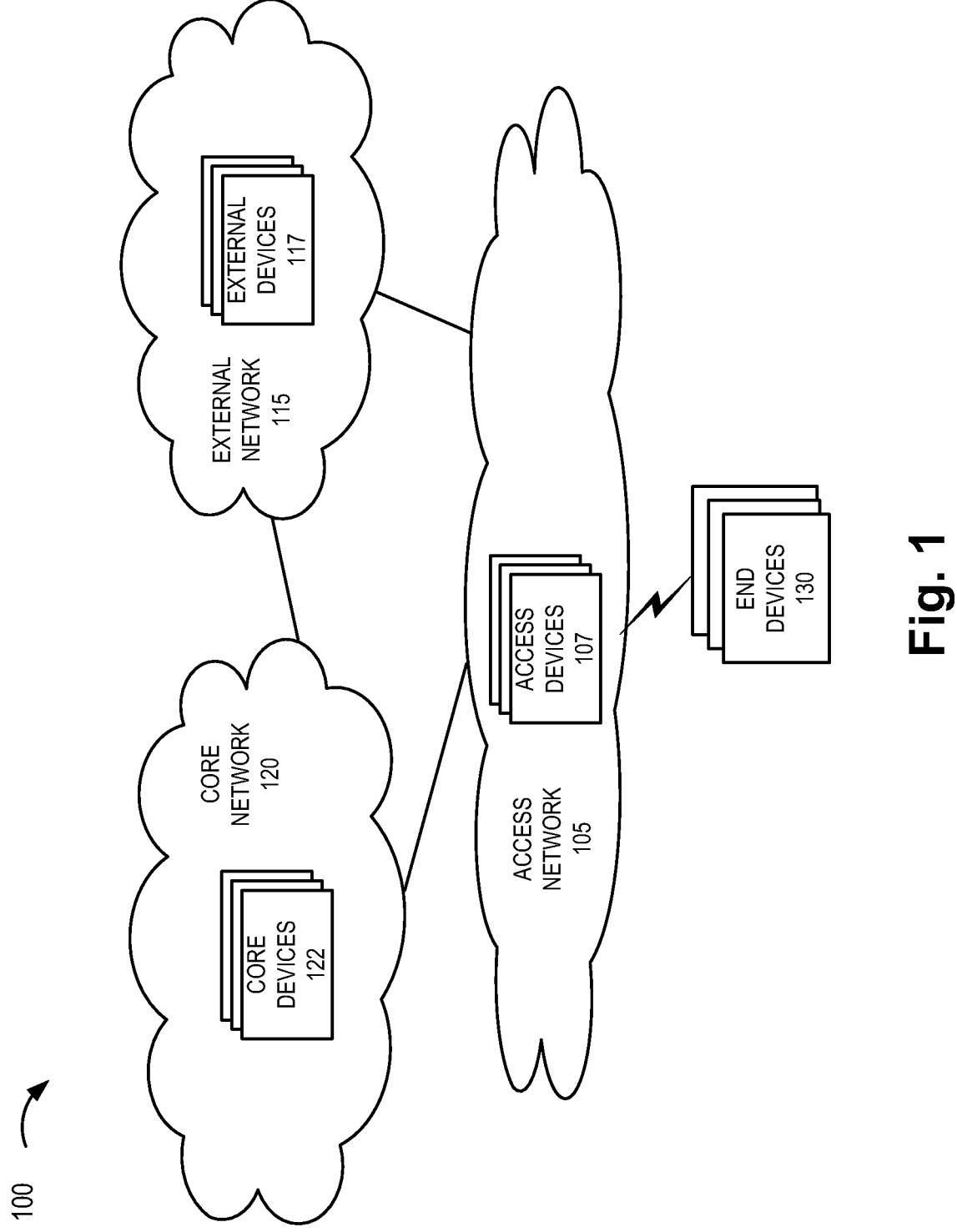
FIG. 1 is a diagram illustrating an exemplary environment in which an exemplary embodiment of an uplink classifier and branching point service may be implemented.

The following detailed description refers to the accompanying drawings. The same reference numbers in different drawings may identify the same or similar elements. Also, the following detailed description does not limit the invention.

Network operators, standardizing entities (e.g., Third Generation Partnership Project (3GPP), 3GPP2, International Telecommunication Union (ITU), European Telecommunications Standards Institute (ETSI), GSM Association (GSMA), etc.), and other types of entities have considered the implementation of uplink classifiers (UL CLs) in the data path of a packet data unit (PDU) session. For example, a user plane function (UPF) may perform uplink classifying to direct flows to specific data networks based on traffic matching filters. A branching point (BP) functionality of the UPF may support routing to and from multiple PDU session anchors (PSAs). Given the limited resources at various locales that may host application services, such as near-edge, mid-edge, far-edge and/or other types of sites, that different locales may provide different versions of the same application services, optimization factors, various requirements associated with mobile network operators (MNOs), vendors, users, etc., the ability to bring application services as close as possible to users using UL CLs and BPs, and/or other implementation concerns, the dynamic management and deployment of UL CLs and BPs can be complex.

According to exemplary embodiments, an uplink classifier and branching point service is described. According to an exemplary embodiment, the uplink classifier and branching point service may be implemented by network devices of a 5G core network or a future generation core network, as described herein. According to an exemplary embodiment, the uplink classifier and branching point service may manage uplink classifier devices and branching point device, such as insertion and deletion, and a manner in which these devices may be inserted and managed according to various architectures including in a serial, distributive, mesh (e.g., fully, partial), and/or hybrid fashion, as described herein.

According to an exemplary embodiment, the uplink classifier and branching point service may dynamically select an application service host device among available sites based on fully qualified domain name (FQDN), end device location, end device identity, resource utilization and one or multiple performance metrics, among other things, as described herein. According to some exemplary embodiments, the available sites may include multi-access edge computing (MEC) networks and/or other types of application layer networks that may be situated near-edge, far-edge, upstream from a core network, co-located with an access network, co-located with a core network, co-located with another type of network, and/or at another location or site based on the managed architectures associated with classifier and branching point devices, as described herein. According to an exemplary embodiment, the application layer networks may include a multi-tier or hierarchical framework. For example, the application layer network may include a three-tiered framework, which may include a centralized tier, an edge tier, and a far edge tier. According to other examples, the application layer network may include a different number of tiers (e.g., two-tiered, four-tiered, etc.) and/or different types of tiers.

In view of the foregoing, the uplink classifier and branching point service may dynamically allow end devices situated in different locations to connect to different application service host devices based on serial, distributed, mesh, and/or hybrid architectures of uplink classifier and branching point devices.

FIG. 1 is a diagram illustrating an exemplary environment 100 in which an exemplary embodiment of uplink classifier and branching point service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices, and the number of end devices 130 are exemplary. For purposes of description, end device 130 is not considered a network device.

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface.

Access network 105 may include one or multiple networks of one or multiple types and technologies. For example, access network 105 may be implemented to include a 5G RAN, a future generation RAN (e.g., a sixth generation (6G) RAN, a seventh generation (7G) RAN, or a subsequent generation RAN), a centralized-RAN (C-RAN), and/or another type of access network. Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and core network 120 including an evolved packet core (EPC) network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, SA, etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone (NSA) new radio (NR), stand-alone (SA) NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, higher than mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, 5G and 6G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device. Access device 107 may include a controller device. For example, access device 107 may include a RAN Intelligent Controller (RIC).

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, access device 107 may provide a wireless access service at a cell, a sector, a sub-sector, carrier, and/or other configurable level.

External network 115 may include one or multiple networks of one or multiple types and technologies. For example, external network 115 may be implemented to include a service or an application layer network, a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application, service, or asset (application service).

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines (VMs), SDN devices, cloud computing devices, platforms, and other types of network devices and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 120 may include one or multiple networks of one or multiple network types and technologies. Core network 120 may include a complementary network of access network 105. For example, core network 120 may be implemented to include an NGC network, an EPC of an LTE network, an LTE-Advanced (LTE-A) network, and/or an LTE-A Pro network, a future generation core network (e.g., a 5G, a 6G, a 7G, or beyond core network, etc.), and/or another type of core network.

Depending on the implementation of core network 120, core network 120 may include various types of network devices that are illustrated in FIG. 1 as core devices 122. For example, core devices 122 may include a UPF, a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

According to an exemplary embodiment, at least a portion of core devices 122 may include uplink classifier and branching point service logic and an interface that supports the uplink classifier and branching point service, as described herein. According to some exemplary embodiments, other network devices of other types of networks (e.g., access network 105, external network 115, an X-haul network, or another type of network) may include uplink classifier and branching point service logic and an interface that supports the uplink classifier and branching point service, as described herein.

End devices 130 include a device that may have computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130. End devices 130 may include "edge-aware" and/or "edge-unaware" application service clients. According to an exemplary embodiment, end device 130 is not to be considered a network device, as described herein.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

Figure 2A:
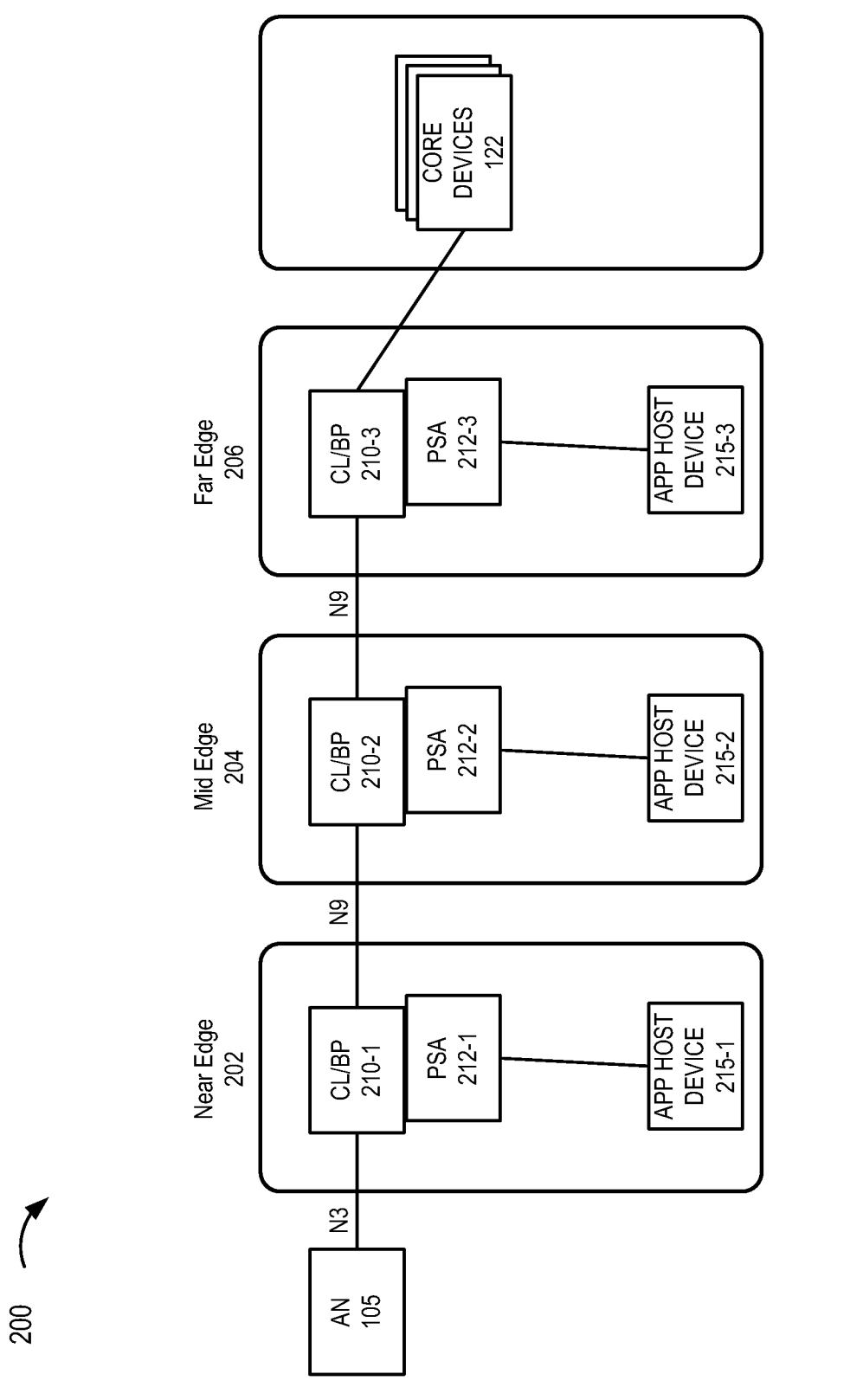
FIGS. 2A-2C are diagrams illustrating exemplary architectures in which exemplary embodiments of the uplink classifier and branching point service may be implemented.

FIG. 2A is a diagram illustrating an exemplary environment 200 in which an exemplary embodiment of uplink classifier and branching point service may be implemented. As illustrated, environment 200 may include a serial UL CL/BP architecture. Environment 200 may include an access network (AN) 105 that may serially connect to near edge 202, mid edge 204, and far edge 206 sites. Near edge 202 site may include a CL/BP 210-1, a PSA 212-1, and an application host device 215-1, mid-edge 204 may include a CL/BP 210-2, a PSA 212-2, and application host device 215-2, and a CL/BP 210-3, a PSA 212-3, and an application host device 215-3. As illustrated, CL/BP 210s may be connected to each other in a serial fashion. Environment 200 may include core devices 122, such as a UPF, a UDR, an SMF, a PCF, a UDM, an AUSF, and/or other types of core devices 122, as described herein. Interfaces N3 and N9 illustrated in environment 200 are exemplary. According to other exemplary embodiments, other types of interfaces (e.g., service-based (e.g., Nupf, etc.), O-RAN, etc.) may be implemented, as described herein. As described herein, the uplink classifier and branching point service may offload traffic dynamically via the serial architecture based on various criteria, as described herein.

Figure 2B:
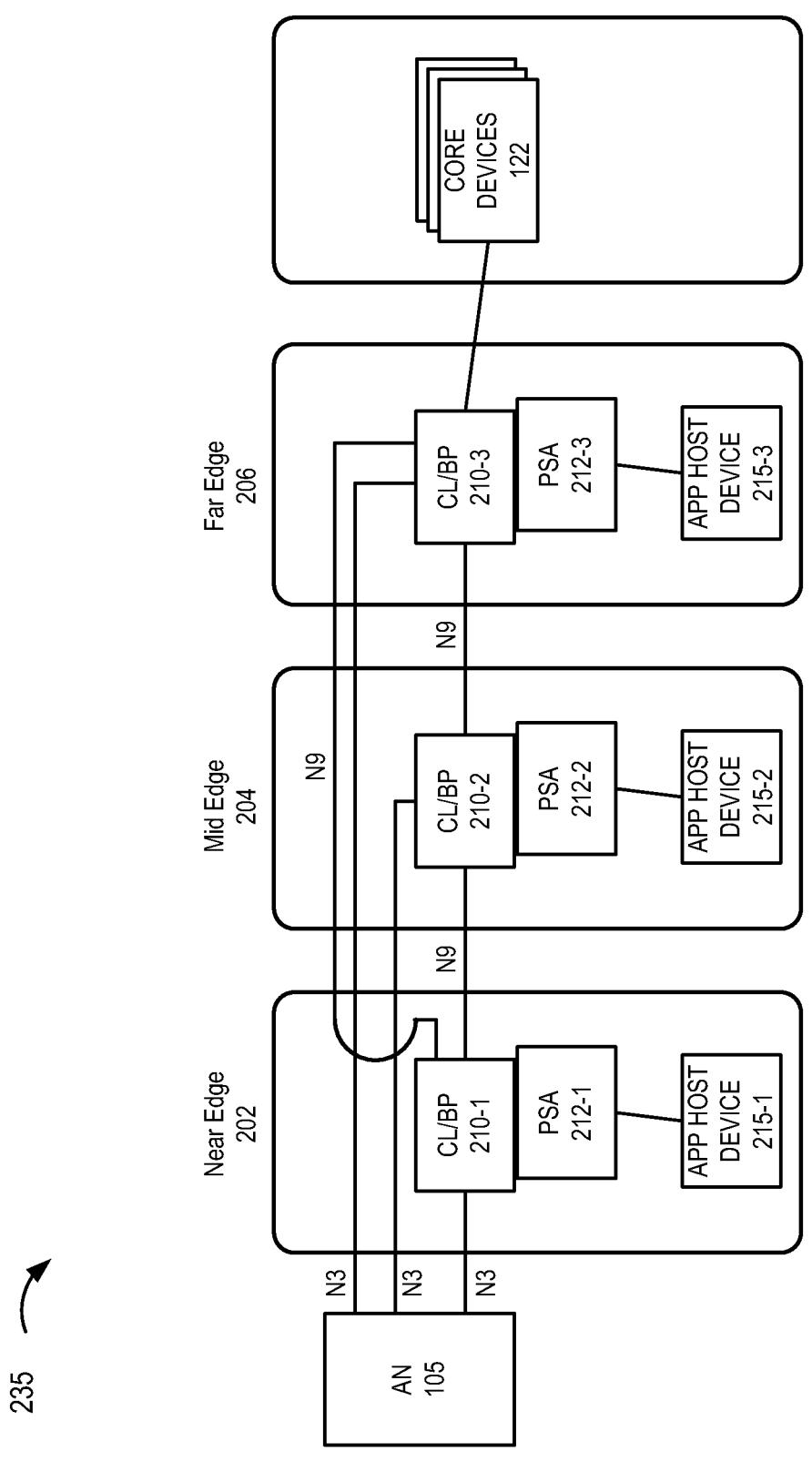

FIG. 2B is a diagram illustrating another exemplary environment 235 in which an exemplary embodiment of uplink classifier and branching point service may be implemented. As illustrated, environment 235 may include a distributed UL CL/BP architecture. Environment 235 may include an access network 105 that may connect to near edge 202, mid edge 204, and far edge 206 sites. Near edge 202 site may include a CL/BP 210-1, a PSA 212-1, and an application host device 215-1, mid-edge 204 may include a CL/BP 210-2, a PSA 212-2, and application host device 215-2, and a CL/BP 210-3, a PSA 212-3, and an application host device 215-3. As illustrated, CL/BP 210s may be connected to each other in a distributed fashion. Environment 235 may include core devices 122, as described herein. Interfaces N3 and N9 illustrated in environment 235 are exemplary. According to other exemplary embodiments, other types of interfaces (e.g., service-based (e.g., Nupf, etc.), O-RAN, etc.) may be implemented, as described herein. As described herein, the uplink classifier and branching point service may offload traffic dynamically via the distributed architecture based on various criteria, as described herein.

Figure 2C:
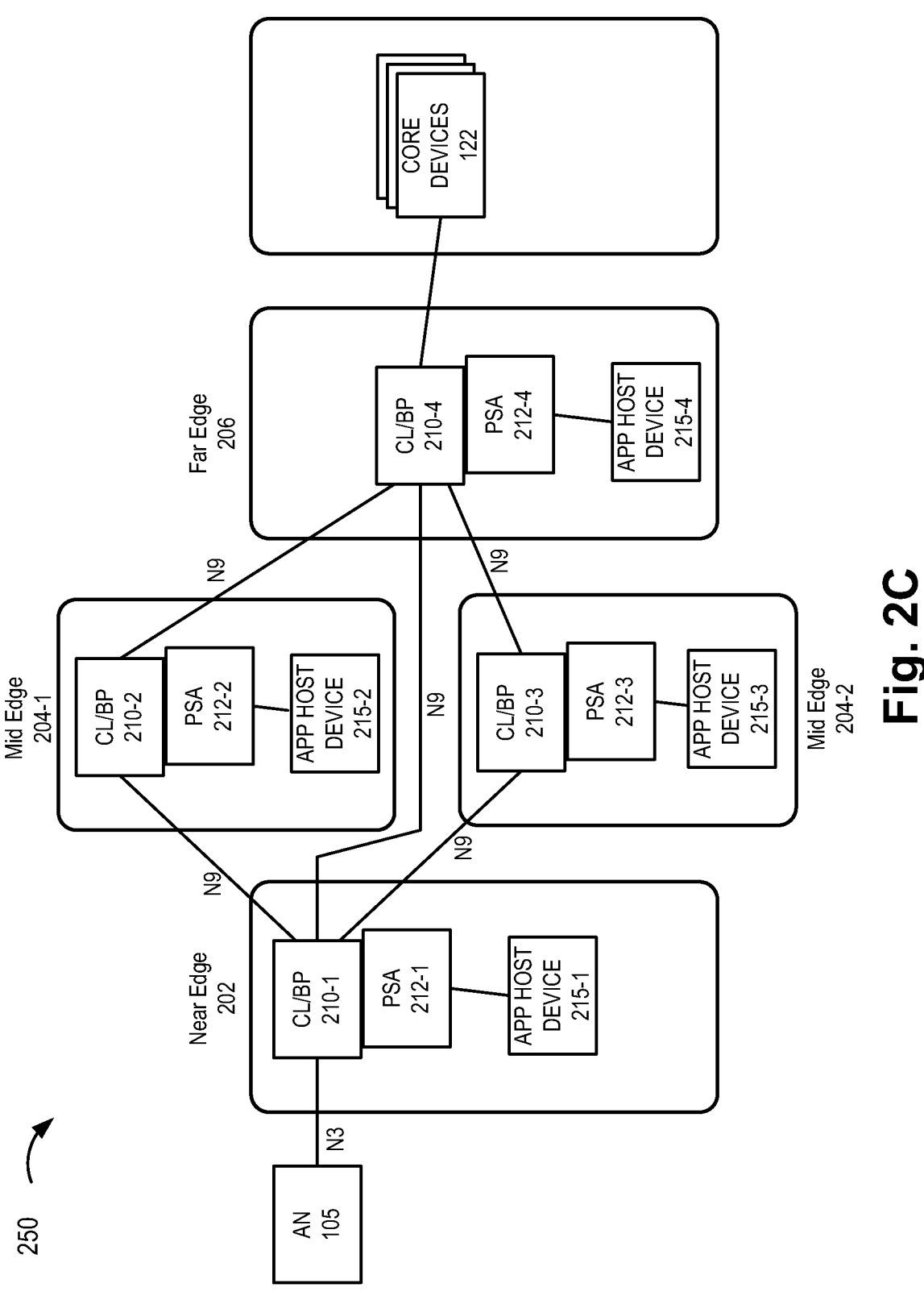

FIG. 2C is a diagram illustrating yet another exemplary environment 250 in which an exemplary embodiment of uplink classifier and branching point service may be implemented. As illustrated, environment 250 may include a mesh or hybrid UL CL/BP architecture. Environment 250 may include an access network 105 that may connect to a near edge 202, a mid edge 204-1, a mid edge 204-2, and far edge 206 sites. Near edge 202 site may include a CL/BP 210-1, a PSA 212-1, and an application host device 215-1, mid edge 204-1 may include a CL/BP 210-2, a PSA 212-2, and application host device 215-2, mid edge 204-2 may include a CL/BP 210-3, a PSA 212-3, and an application host device 215-3, and far edge 206 may include a CL/BP 210-4, a PSA 212-4, and an application host device 215-4. As illustrated, CL/BP 210s may be connected to each other in a mesh fashion (e.g., fully mesh, partial mesh, etc.). Environment 250 may include core devices 122, as described herein. Interfaces N3 and N9 illustrated in environment 235 are exemplary. According to other exemplary embodiments, other types of interfaces (e.g., service-based (e.g., Nupf, etc.), O-RAN, etc.) may be implemented, as described herein. As described herein, the uplink classifier and branching point service may offload traffic dynamically via the mesh or hybrid architecture based on various criteria, as described herein.

FIGS. 3A-3D are diagrams illustrating an exemplary process 300 of an exemplary embodiment of an uplink classifier and branching point service. For purposes of description of process 300, the environment may include a NRF 302, an SMF 304, an edge application service discovery function (EAS DF) 306, and a UPF 308-1. The arrangement and connection between network devices are exemplary and according to other exemplary embodiments, the environment may be different. A connection between network devices may be indirect and may include one or multiple intermediary network devices and/or networks not illustrated, as previously mentioned.

NRF 302, SMF 304, EAS DF 306, and UPF 308-1 may each operate and provide a function according to a standard (e.g., 3GPP, ITU, etc.) and/or a proprietary technology. For example, NRF 302 may include providing repository, NF registration, and discovery services, SMF 304 may include providing PDU session management, IP address allocation, and tunnel and notification management services, EAS DF 306 may include providing discover services pertaining to application services (e.g., hosted in external network 115 and/or another application layer network), and UPF 308-1 may include providing packet routing and forwarding, packet inspection, QoS handling, traffic usage reporting, uplink classification, and branching functionalities. According to some exemplary embodiments, EAS DF 306 may be implemented as an enhanced domain name system (DNS) network device or an edge enabler server (EES) of a MEC network or another type of edge application service layer network.

According to an exemplary embodiment, SMF 304 may include logic and a communication interface that supports the uplink classifier and branching point service. According to an exemplary embodiment, other network devices of core network 120, as described herein, may include logic and a communication interface that supports the uplink classifier and branching point service.

Figure 3A:
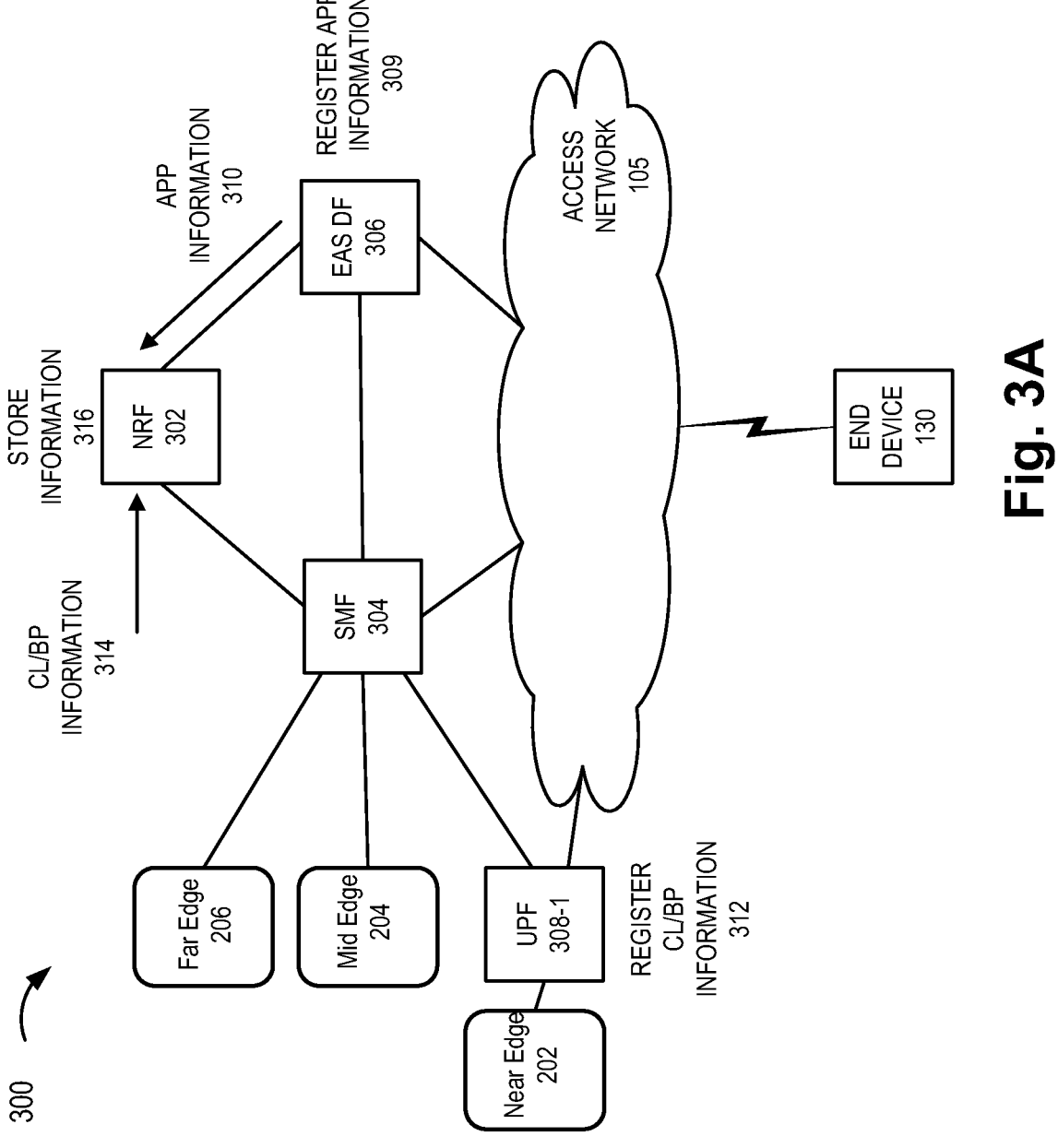
FIGS. 3A-3D are diagrams illustrating an exemplary process of an exemplary embodiment of the uplink classifier and branching point service.

Referring to FIG. 3A, assume that EAS DF 306 may register 309 application service information with NRF 302. For example, application service information 310 may include data network access identifier (DNAI) information, network addresses (e.g., IP addresses, uniform resource identifiers (URIs), etc.) of application service host devices (e.g., MEC servers and/or another type of application service network device), and/or fully qualified domain names (FQDNs). The application service information 310 may include other information, such as geographic location information pertaining to the application service layer network, network-related location (e.g., near-edge, mid-edge, far-edge, cloud RAN, and/or other nomenclature), and/or other network-related information (e.g., network slice identifiers, etc.).

Additionally, assume that UPFs or UL CLs and/or BPs, which includes UPF 308-1, may register 312 CL/BP information with NRF 302. For example, CL/BP information 314 may include location information pertaining to UPF/CL/BP network devices (e.g., near edge, mid edge, far edge, etc.), network capacity information, such as maximum number of user plane connections supported, total network resources (e.g., processor, memory, communication interface, physical, logical, virtual, etc.), and application services that may be accessed via the UPF/CL/BP. The CL/BP information 314 may include other network-related information (e.g., network slice identifiers, communication link identifiers, etc.), type of UL CL architecture (e.g., serial, distributed, partial mesh, fully mesh), and/or use of BPs or not, configurations of BPs thereof. The type of UL CL architecture and BP information may relate to an individual UPF/UL CL directly or the individual UPF/UL CL and neighboring UPF(s)/UL CL(s). As illustrated, NRF 302 may store this information 316 (e.g., application service information 310 and CL/BP information 314).

Figure 3B:
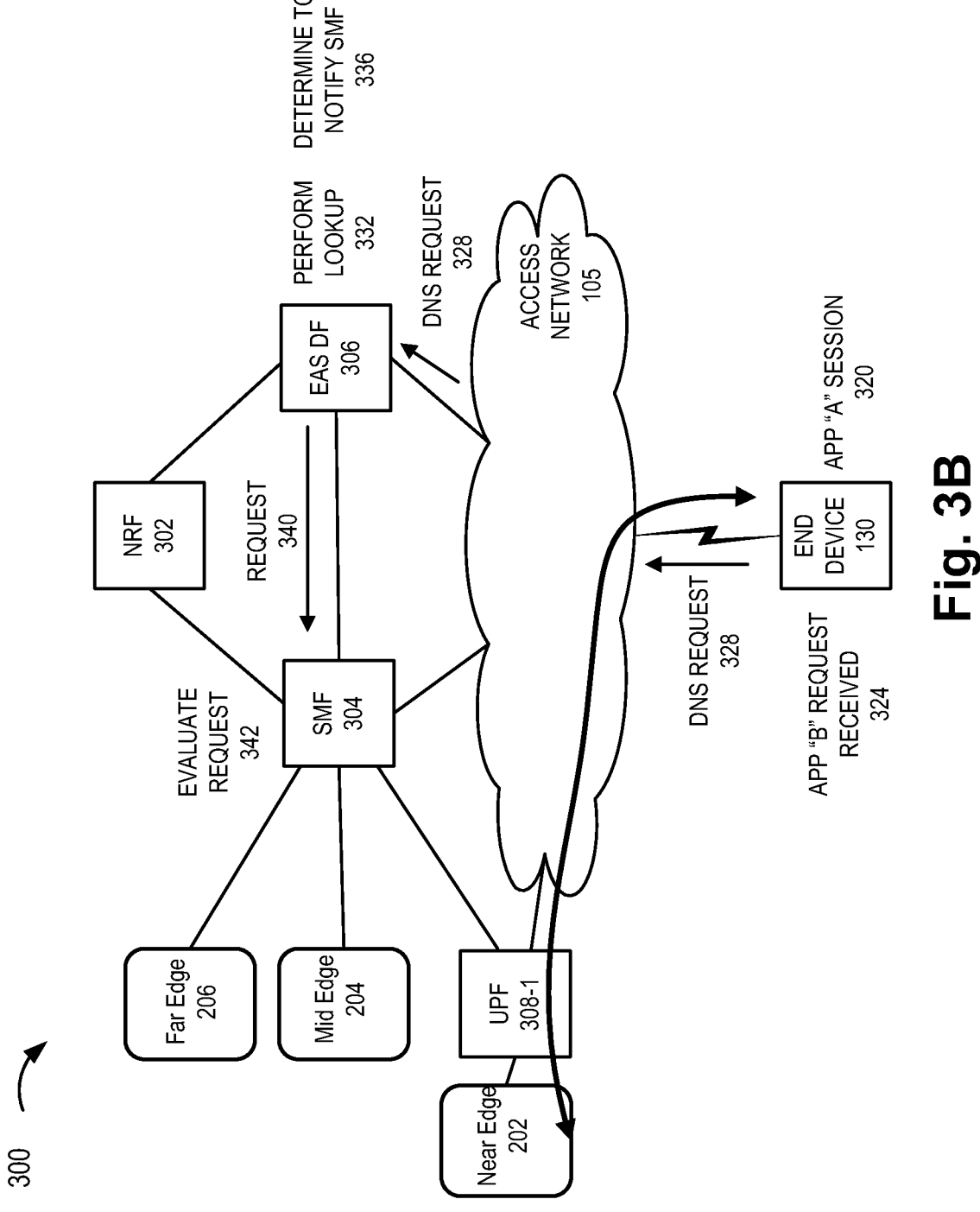

Referring to FIG. 3B, assume that end device 130 has an ongoing application session 320 with an application service host device of near edge 202. For example, the application session may relate to an application "A". Thereafter, end device 130 may determine that a user of end device 130 is attempting to run another application (e.g., an application "B") or an application that may be related to application "A" but is not hosted via UPF 308-1 associated with the application session of application "A". For purposes of illustration, an application "B" request is received 324, as depicted in FIG. 3B.

Based on this exemplary scenario, end device 130 may generate and transmit a DNS request 328 to EAS DF 306. In response to receiving DNS request 328, EAS DF 306 may perform a lookup 332. For example, EAS DF 306 may consult information, which may include application service information 310, to determine whether there is a suitable application service host device to provide the requested application service. EAS DF 306 may consider the location of end device 130 and matching rules configured at EAS DF 306.

According to one exemplary scenario, when EAS DF 306 is unable to match a suitable application service host device to DNS request 328, EAS DF 306 may provide a DNS response to end device 130 that may cause end device 130 to access the requested application service via the Internet or best effort traffic instead of from an edge network. According to another exemplary scenario, when EAS DF 306 is able to match a suitable application service host device (e.g., in at least one of the edge networks 202, 204, 206), EAS DF 306 may determine to inform SMF 304 of DNS request 328, as illustrated in FIG. 3B. For example, EAS DF 306 may transmit a request 340 to SMF 304. Request 340 may include DNS request 328 information and information pertaining to the candidate application service host device, edge network, and/or end device 130. For example, the end device information may include an identifier of end device 130 (e.g., a subscription permanent identifier (SUPI), a subscription concealed identifier (SUCI), or similar identifier).

Based on receiving request 340, SMF 304 may evaluate 342 the request. For example, although not illustrated, SMF 304 may obtain location information pertaining to end device 130 (e.g., from an AMF). SMF 304 may evaluate the request based on the current location associated with end device 130, the available UPF(s)/UL CL(s), and the current load(s) of the UPF(s)/UL CL(s) that may provide user plane connectivity to the requested application service.

Figure 3C:
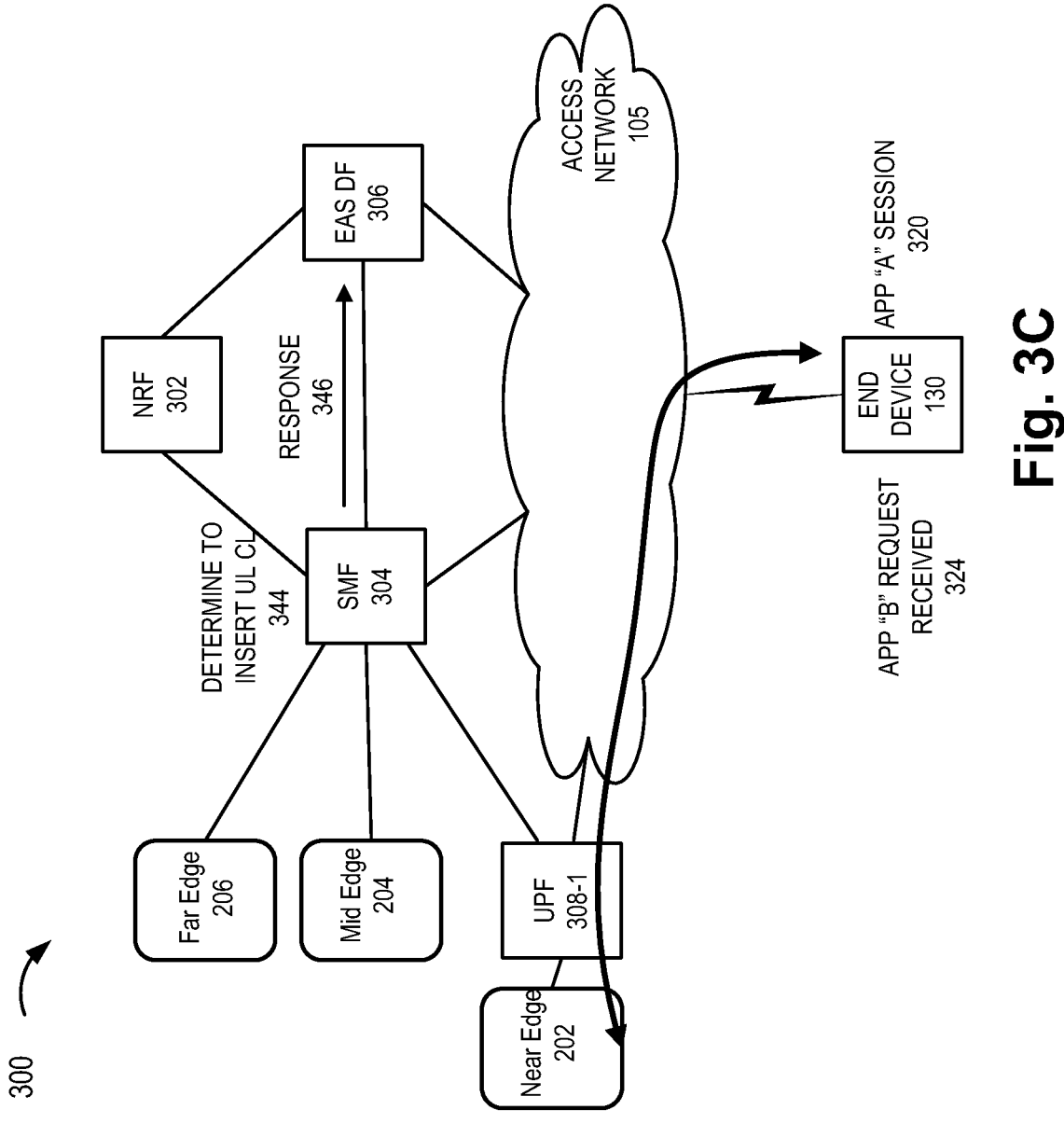

According to one exemplary scenario, SMF 304 may determine that one of the available UPF(s) or UL CL(s) may support the requested application service. According to another exemplary scenario, SMF 304 may determine that none of the available UPF(s) or UL CL(s) may support the requested application service, and may determine to insert an additional UL CL 344, as illustrated in FIG. 3C.

According to an exemplary embodiment, SMF 304 may determine which of the available UL CL architectures to implement for the new UL CL to be inserted. For example, SMF 304 may make a ternary choice among the available architectures (e.g., serial, distributed, mesh (e.g., partial or full)) as to the configuration of the new UL CL. According to other exemplary embodiments, in view of the available architectures, SMF 304 may make a binary choice or a quaternary or higher choice. According to some exemplary embodiments, SMF 304 may make this selection based on the location of the UL CL to be inserted and the current architecture associated with neighboring UL CLs. According to some exemplary embodiments, SMF 304 may make this selection based on network state information (e.g., congestion, loads at neighboring UL CLs, etc.) and/or performance metrics (e.g., latency, throughput, packet error, etc.) associated with the requested application service. SMF 304 may obtain the current architecture, network state information, and/or performance metric information from NRF 302. SMF 304 may also determine which of the edge network(s) (e.g., near edge 202, mid edge 204, far edge 206) the new UL CL is to provide user plane connectivity to based on the information, as described herein. For example, SMF 304 may determine the edge network and/or the application service host device that is to provide the requested application service. According to some exemplary embodiments, the selections made by SMF 304 may be based on information generated by an artificial intelligence and/or machine learning (AI/ML) network device (not illustrated). For example, the information may provide optimal configurations based on learned UL CL architectures, different application services, state information associated with an edge network and/or other networks (e.g., access network 105, core network 120, etc.). The information may be static or dynamic and may be stored at NRF 302, for example.

As further illustrated, SMF 304 may generate and transmit a response 346 to EAS DF 306. For example, response 346 may include information indicating that a new UL CL is to be inserted, an IP address or another type of address for the new UL CL, and/or other information of relevance to enable end device 130 to establish the requested application service session via the new UL CL to be inserted.

Figure 3D:
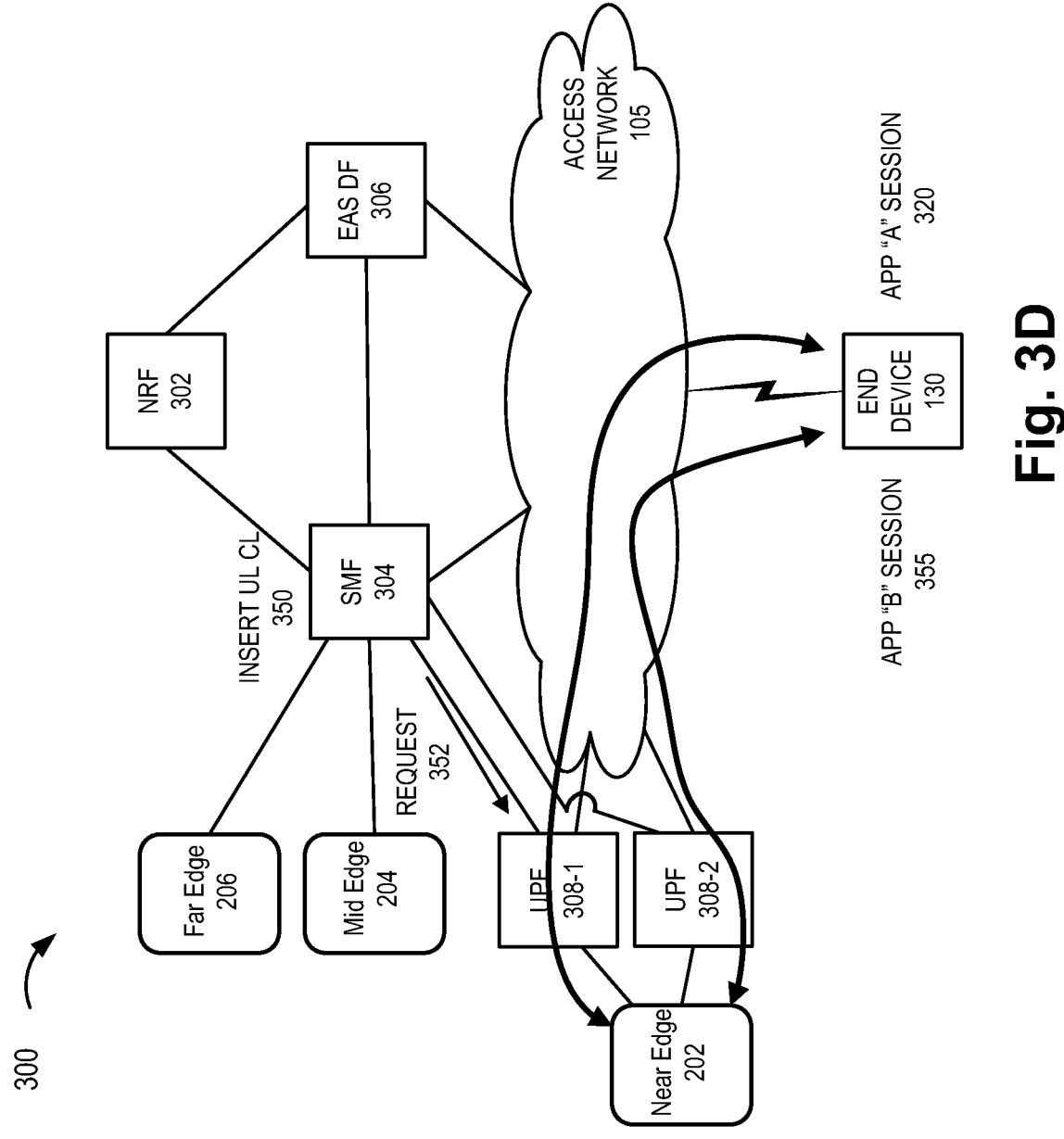

Referring to FIG. 3D, SMF 304 may insert 350 a new UL CL or UPF (e.g., UPF 308-2) according to the determinations made. For example, according to this exemplary scenario, SMF 304 may transmit a request 352 to near edge 202 or another suitable network device that may manage the instantiation of UPF 308-2. For example, although not illustrated, a near edge management device may manage the instantiation of UPF 308-2 and associated communication link(s) that support user plane connectivity to the requested application service as well as other planes (e.g., control, etc.) with other network devices (e.g., SMF 304, etc.). As illustrated, end device 130 may establish an application "B" session with near edge 202 via UPF 308-2.

Figure 3E:
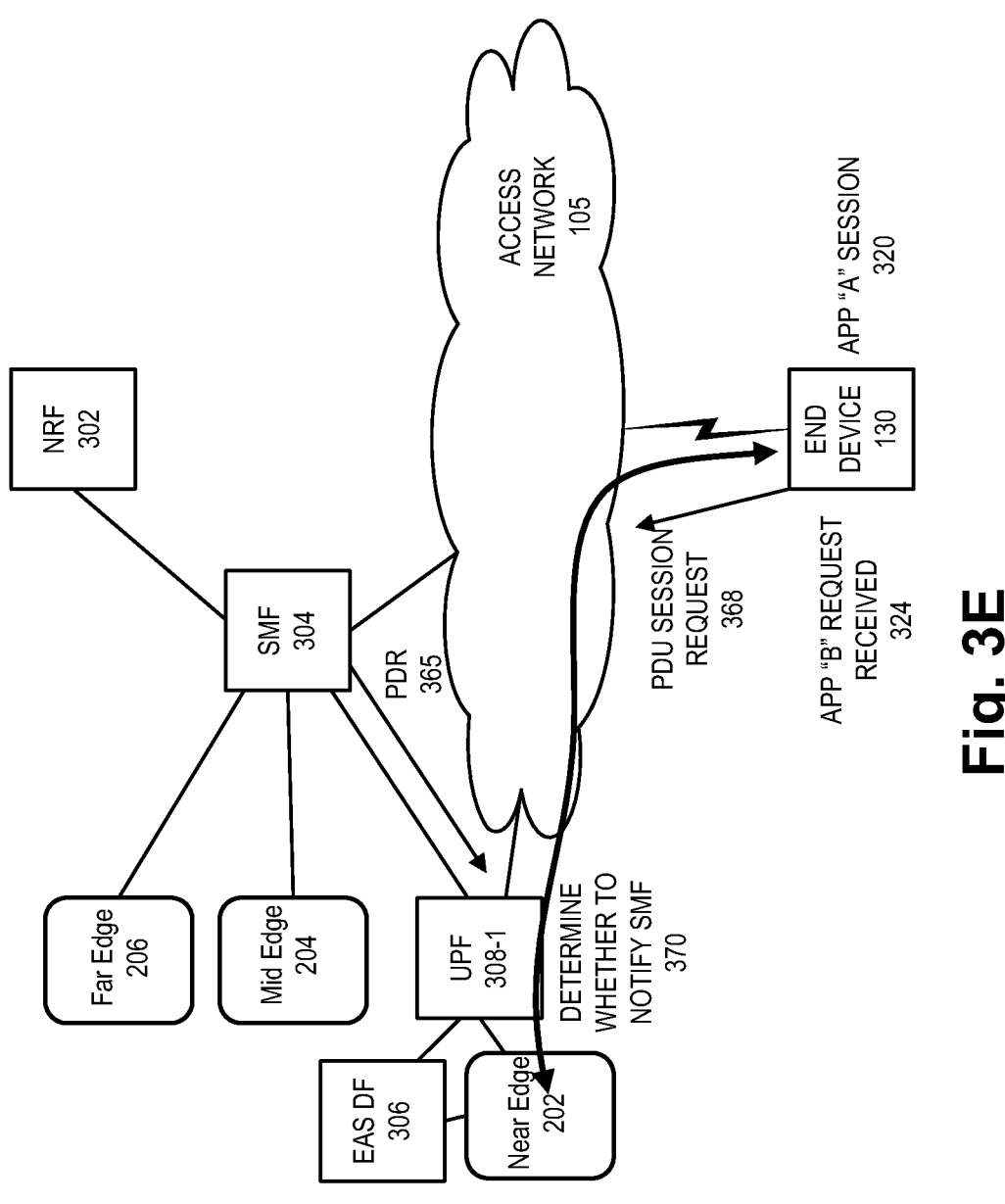
FIGS. 3E-3G are diagrams illustrating another exemplary process of an exemplary embodiment of the uplink classifier and branching point service.
Figure 3F:
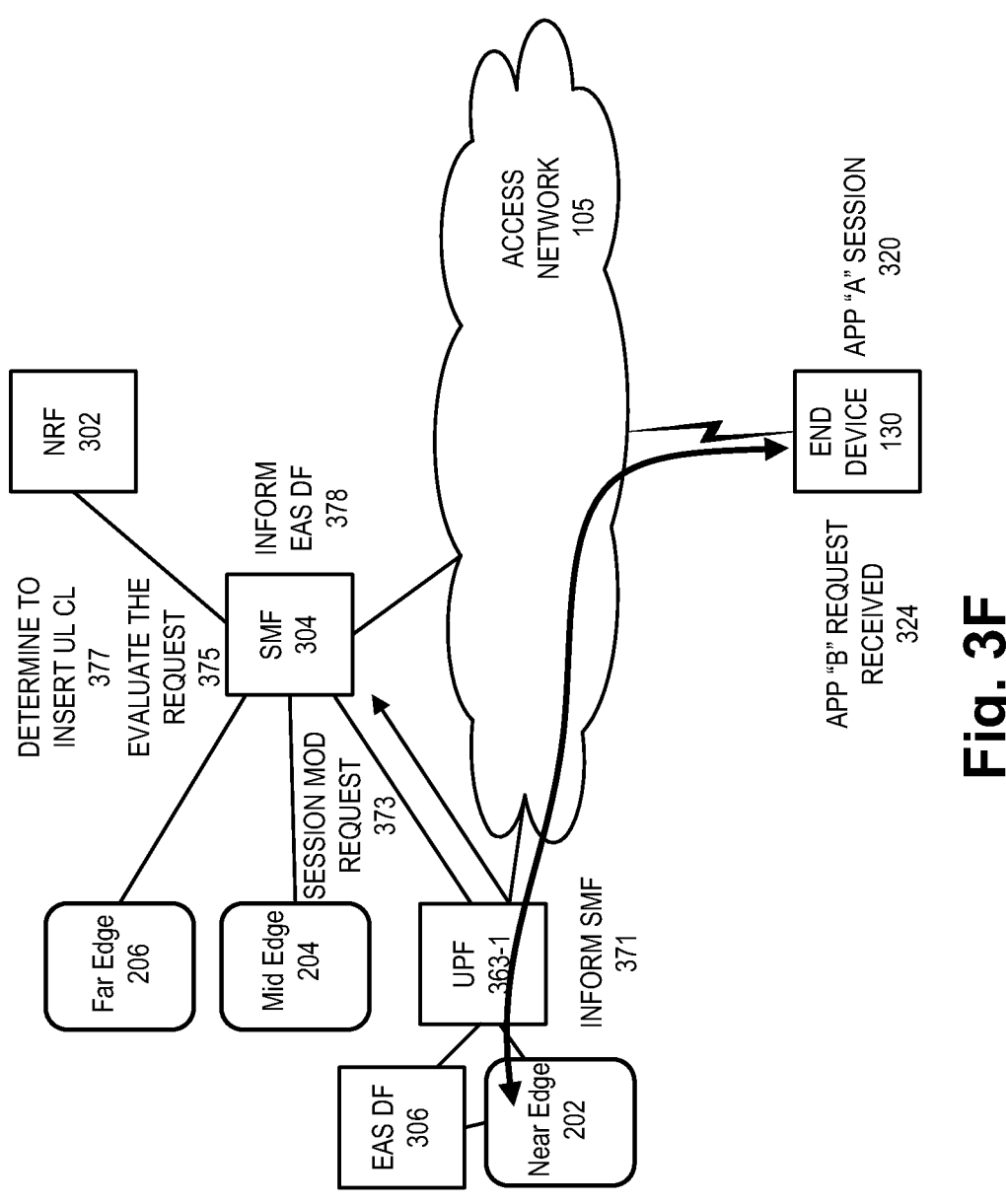
Figure 3G:
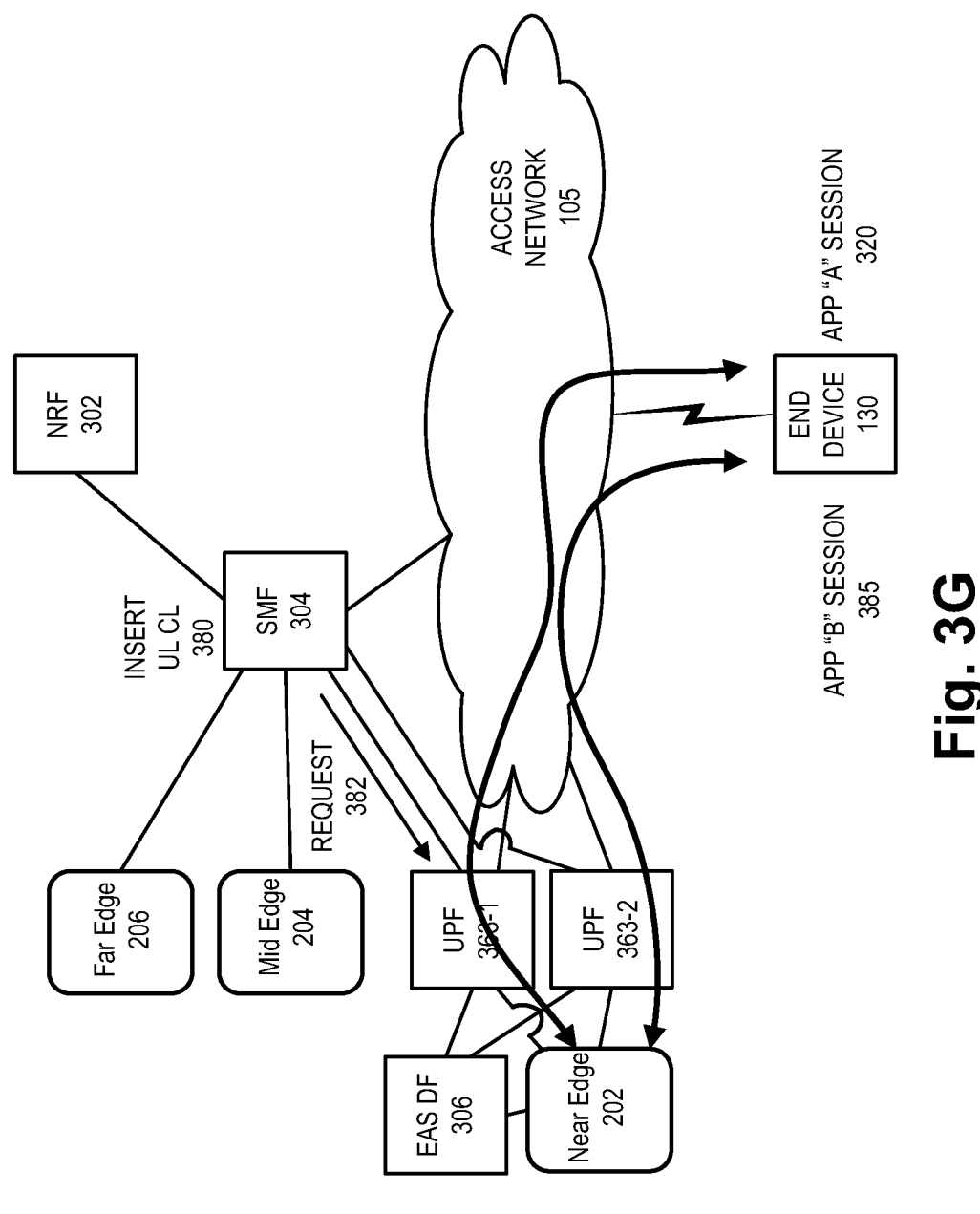

FIGS. 3E-3G are diagrams illustrating another exemplary process 360 of an exemplary embodiment of an uplink classifier and branching point service. The arrangement and connection between network devices are exemplary and according to other exemplary embodiments, the environment may be different. A connection between network devices may be indirect and may include one or multiple intermediary network devices and/or networks not illustrated, as previously mentioned.

According to an exemplary embodiment, process 360 may include similar steps as those previously described. For example, the steps illustrated and described in relation to FIG. 3A may be included in process 360.

Referring to FIG. 3E, in a manner similar to that previously described in relation to FIG. 3B, end device 130 may receive an application "B" request 324 and determine to generate and transmit DNS request 328 to EAS DF 306 via a UPF 308-1. It may be assumed that UPF 308-1 may be configured with packet detection rules (PDRs). For example, as illustrated in FIG. 3E, SMF 304 may provide PDRs 365 to UPF 308-1 (e.g., via a control plane connection). The PDRs may include packet data information that indicates application identifiers, host names, FQDNs, and/or other types of information that may identify application services and correlated information that may indicate whether to inform SMF 304 or not when application traffic is detected by UPF 308-1. For example, the PDRs may configure UPF 308-1 to inform SMF 304 or not when user plane traffic of a certain application service is detected.

According to an exemplary scenario, assume end device 130 receives a DNS response and end device 130 may transmit 368 a PDU session request to establish an application service session with an application service host device of near edge 202 via UPF 308-1. Based on the PDRs, UPF 308-1 may detect the request and determine whether to notify 370 SMF 304 of the detected user plane traffic. According to another exemplary scenario, UPF 308-1 may detect traffic of an already established application service session.

According to either scenario, UPF 308-1 may perform (deep) packet inspection and determine an application service identifier or information that may be correlated to the PDR information so as to determine whether to inform SMF 304 or not based on the detected packet(s). When the detected packets or traffic of the application service session does not invoke the UPF 308-1 to inform SMF 304, the PDU session request or application service session traffic may be routed as normal. However, when the detected packets or traffic of the application service session does invoke the UPF 308-1 to inform SMF 304, UPF 308-1 may inform 371 SMF 304, as illustrated in FIG. 3F. For example, according to an exemplary implementation, UPF-308-1 may generate and transmit 373 a session modification request to SMF 304. The session modification request may include information indicating the detected application service. The session modification request may include other information, such as an identifier of end device 130 (e.g., SUPI, etc.), QoS information pertaining to the application service, a QCI value pertaining to the application service, and/or other information of relevance.

Based on receiving the session modification request (or another type of suitable request), SMF 304 may evaluate 375 the request. In a manner similar to that previously described in relation to process 300 of FIGS. 3B-3D, SMF 304 may determine to insert 377 a new UL CL, and inform 378 EAS DF 306 about the new UL CL, as depicted in FIG. 3F. Although not illustrated, SMF 304 may acknowledge or provide a session modification response to UPF 308-1. Similarly, in FIG. 3G, SMF 304 may perform operations similar to that previously described, such as to insert 380 an UL CL and transmit a request 382 to near edge 202 or another suitable network device that may manage the instantiation of UPF 308-2. As illustrated, end device 130 may establish an application "B" session with near edge 202 via UPF 308-2.

FIGS. 3A-3D and 3E-3G are diagrams illustrating exemplary embodiments of processes associated with the uplink classifier and branching point service. According to other exemplary embodiments, process 300 and/or process 360 may include additional, fewer, and/or different operations or steps, which may or may not depend on context and/or a particular scenario. Additionally, for the example, although process 300 and process 360 have described the insertion of a new UL CL, according to various exemplary embodiments, process 300 and/or process 360 may include the deletion of an existing UL CL or UPF depending on the various criteria analyzed by SMF 304, for example, as described herein. Additionally, according to various exemplary embodiments, the management of UL CLs, BPs, and/or UPFs by SMF 304 or similar network device may be performed continuously and not necessarily dependent on receiving a request (e.g., a DNS request, a session modification request, etc.).

Figure 4:
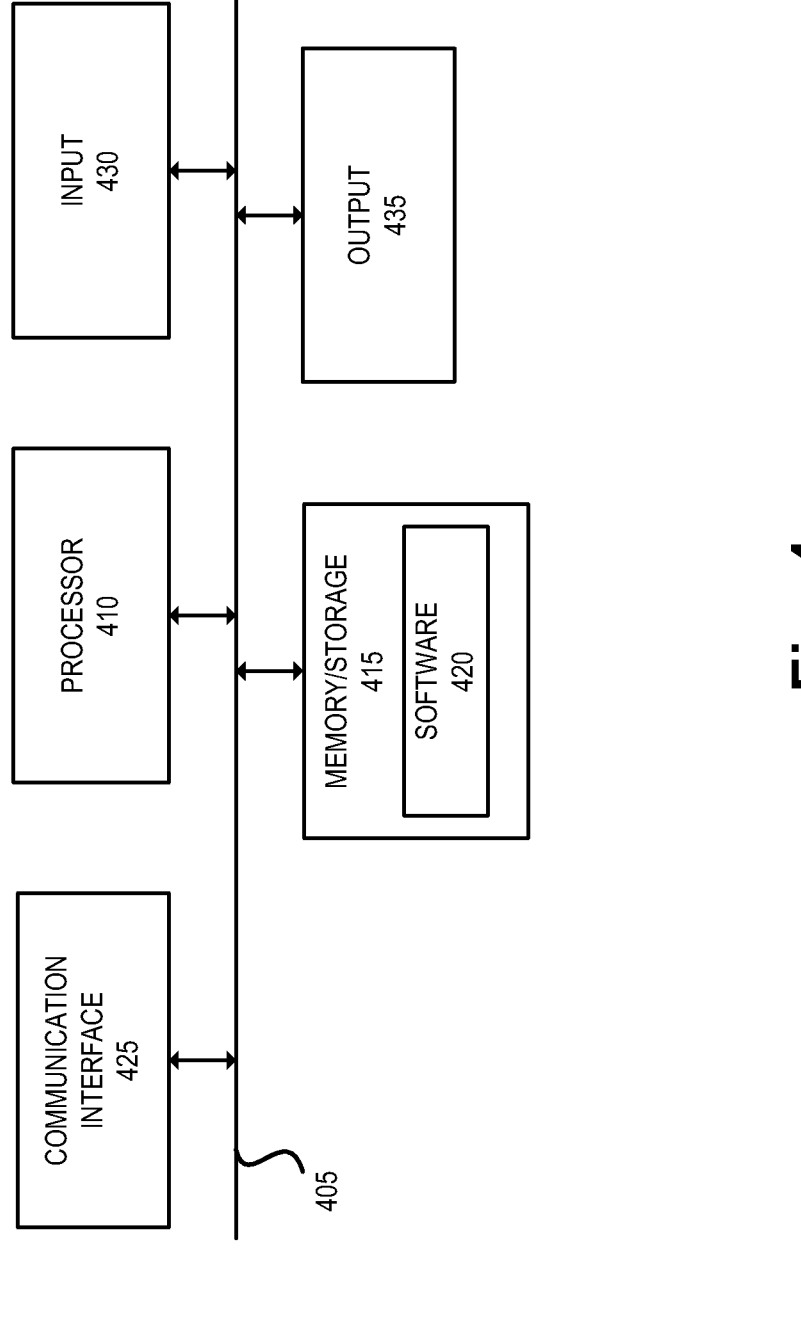
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, core device 122, end device 130, CL/BP 210, PSA 212, app host device 215, NRF 302, SMF 304, EAS DF 306, UPF 308, and/or other types of network devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to application service manager 119, software 420 may include an application that, when executed by processor 410, provides a function and/or a process of uplink classifier and branching point service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application layer network (e.g., external network 115) and/or another type of network (e.g., access network 105, core network 120, etc.). Thus, network devices described herein may be implemented as device 400. For example, CL/BP 210, PSA 212, and/or UPF 308 may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
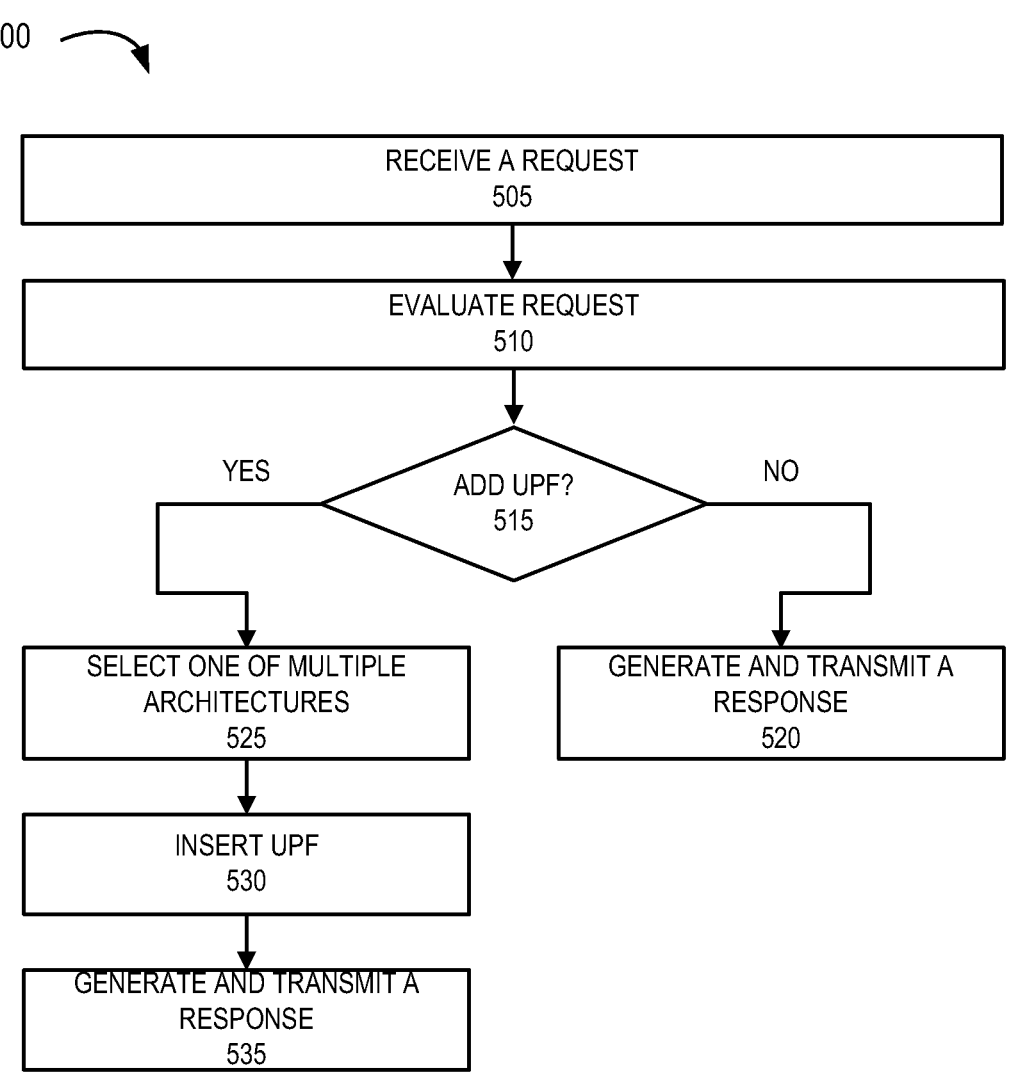
FIG. 5 is a flow diagram illustrating an exemplary process of an exemplary embodiment of an uplink classifier and branching point service.

FIG. 5 is a flow diagram illustrating an exemplary process 500 of an exemplary embodiment of uplink classifier and branching point service. According to an exemplary embodiment, SMF 304 may perform a step of process 500. According to an exemplary implementation, processor 410 executes software 420 to perform the step of process 500, as described herein. Alternatively, the step may be performed by execution of only hardware. Additionally, as described herein, an interface of SMF 304 may support a communication of information for the uplink classifier and branching point service.

In block 505, SMF 304 may receive a request. For example, SMF 304 may receive a request from an EAS DF 306, as described herein.

In block 510, SMF 304 may evaluate the request. For example, SMF 304 may analyze the request and make determinations associated with the request, such as location of end device 130, available UPFs that provide user plane connectivity to the requested application service, and current loads associated with the UPFs, as described herein.

In block 515, SMF 304 may determine whether to add a UPF. For example, SMF 304 may that one of the available UPFs may support the requested application service or not, as described herein. When it is determined to not add the UPF (block 515-NO), SMF 304 may generate and transmit a response (block 520). For example, SMF 304 may transmit a DNS response to EAS DF 306 that includes a network address of the selected available UPF.

When it is determined to add the UPF (block 515—YES), SMF 304 may select one of multiple architectures (block 525). For example, SMF 304 may make this determination based on various types of information, as described herein. SMF 304 may also make a determination which of the available edge networks may provide the requested application service. For purposes of description, the addition of the UPF may include a UPF or a functional element of the UPF, such as an UL CL, a BP, and/or a PSA.

In block 530, SMF 304 may insert the UPF. For example, SMF 304 may invoke the instantiation of the new UPF and communication links. In block 535, SMF 304 may generate and transmit a response. For example, the response may include a DNS response to EAS DF 306, as described herein.

FIG. 5 illustrates an exemplary embodiment of a process of uplink classifier and branching point service, according to other exemplary embodiments, the uplink classifier and branching point service may perform additional operations, fewer operations, and/or different operations than those illustrated and described.

Figure 6:
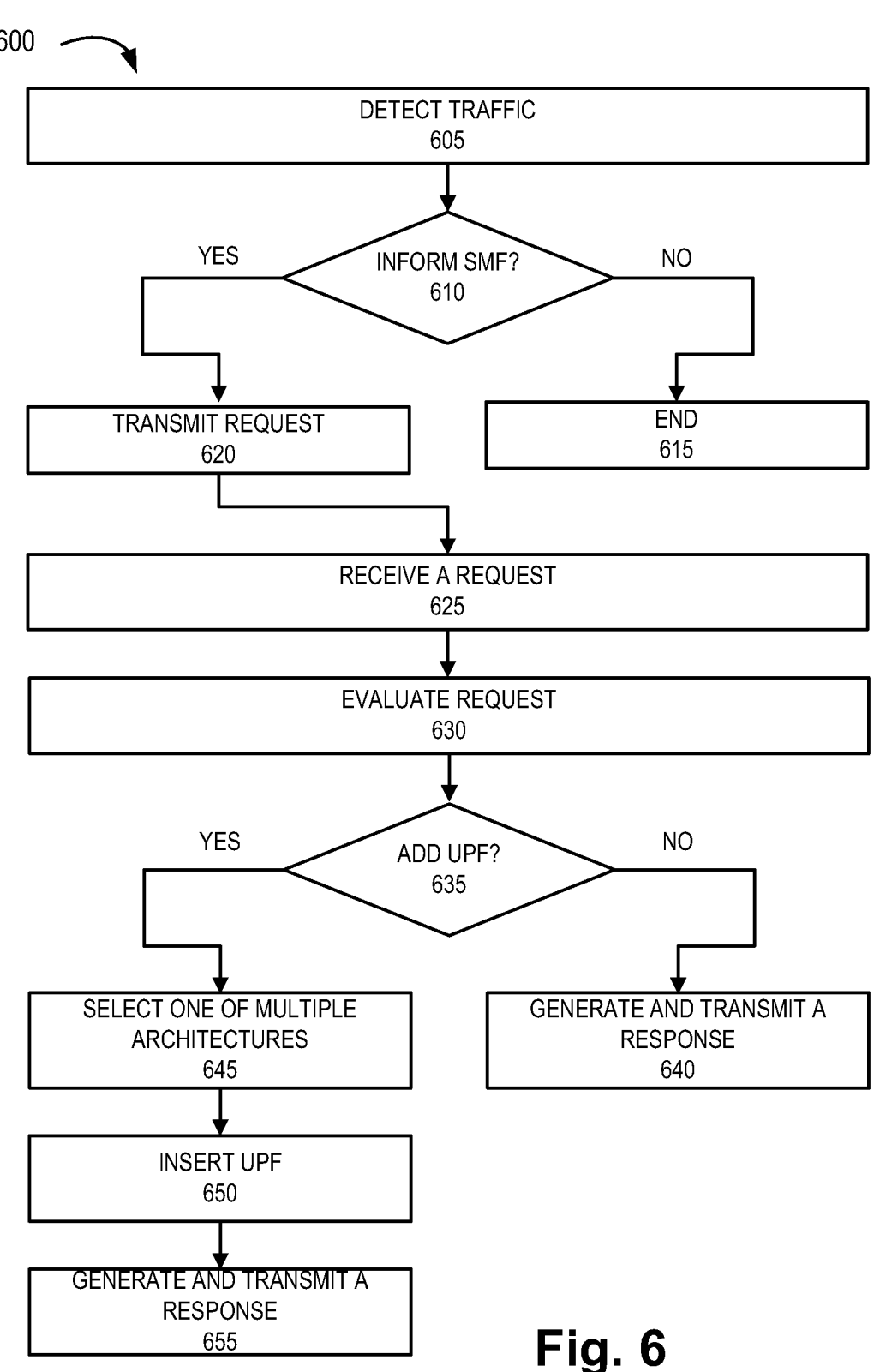
FIG. 6 is a flow diagram illustrating another exemplary process of an exemplary embodiment of an uplink classifier and branching point service.

FIG. 6 is a flow diagram illustrating an exemplary process 600 of an exemplary embodiment of uplink classifier and branching point service. According to an exemplary embodiment, UPF 308 and SMF 304 may perform a step of process 600. According to an exemplary implementation, processor 410 executes software 420 to perform the step of process 600, as described herein. Alternatively, the step may be performed by execution of only hardware. Process 600 may be performed as a part of an application service establishment procedure.

In block 605, UPF 308 may detect traffic. For example, UPF 308 may detect a request to establish a PDU session or application service session traffic (e.g., post-establishment of the PDU session), as described herein.

In block 610, UPF 308 may determine whether to inform an SMF. For example, UPF 308 may determine whether to inform SMF 304 based on packet detection rules, as described herein. When it is determined to not inform SMF 304 (block 610-NO), process 600 may end. For example, UPF 308 may route the packets towards their destination. When it is determined to inform SMF 304 (block 610—YES), UPF 308 may transmit a request to SMF 304, as described herein (block 620). In block 625, SMF 304 may receive the request. In blocks 630-655, operations similar to those described in blocks 510-535 of process 500 may be performed.

FIG. 6 illustrates an exemplary embodiment of a process of uplink classifier and branching point service, however according to other exemplary embodiments, the uplink classifier and branching point service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
evaluating, by a network device, a request;
determining, by the network device based on the evaluating, to insert a user plane function device or an uplink classifier device according to a configuration based on a binary or higher choice of network architectures, which include at least two of a serial architecture, a distributed architecture, a partial mesh architecture, or a fully mesh architecture from which to select; and
causing, by the network device, an instantiation and an insertion of the user plane function device or the uplink classifier device according to a selected network architecture.

2. The method of claim 1, wherein the network device includes a session management function device of a core network.

3. The method of claim 1, further comprising:
selecting, by the network device, the selected network architecture based on an architecture associated with a neighboring user plane function or a neighboring uplink classifier device.

4. The method of claim 1, further comprising:
transmitting, by the network device, a response that includes information pertaining to the insertion of the user plane function device or the uplink classifier device.

5. The method of claim 1, wherein the evaluating comprises:
evaluating, by the network device, a location of an end device pertaining to the request, available user plane function devices or uplink classifier devices, and current loads associated with the available user plane function devices or uplink classifier devices.

6. The method of claim 1, wherein the request includes a domain name system request or a session modification request.

7. The method of claim 1, wherein the evaluating comprises:
determining, by the network device, at least one of an application service layer network or an application service layer host device to provide an application service to which the request pertains.

8. The method of claim 1, wherein the evaluating comprises:
evaluating, by the network device, a performance pertaining to the request.

9. A network device comprising:
a processor configured to:
evaluate a request;
determine, based on the evaluation, to insert a user plane function device or an uplink classifier device according to a configuration based on a binary or higher choice of network architectures, which include at least two of a serial architecture, a distributed architecture, a partial mesh architecture, or a fully mesh architecture from which to select; and
cause an instantiation and an insertion of the user plane function device or the uplink classifier device according to a selected network architecture.

10. The network device of claim 9, wherein the network device includes a session management function device of a core network.

11. The network device of claim 9, wherein the processor is further configured to:
select the selected network architecture based on an architecture associated with a neighboring user plane function or a neighboring uplink classifier device.

12. The network device of claim 9, wherein the processor is further configured to:
transmit a response that includes information pertaining to the insertion of the user plane function device or the uplink classifier device.

13. The network device of claim 9, wherein, when evaluating, the processor is further configured to:
evaluate a location of an end device pertaining to the request, available user plane function devices or uplink classifier devices, and current loads associated with the available user plane function devices or uplink classifier devices.

14. The network device of claim 9, wherein the request includes a domain name system request or a session modification request.

15. The network device of claim 9, wherein, when evaluating, the processor is further configured to:
determine at least one of an application service layer network or an application service layer host device to provide an application service to which the request pertains.

16. The network device of claim 9, wherein, when evaluating, the processor is further configured to:
evaluate a performance pertaining to the request.

17. A non-transitory computer-readable storage medium storing instructions executable by a processor of a network device, which when executed cause the processor to:
evaluate a request;
determine, based on the evaluation, to insert a user plane function device or an uplink classifier device according to a configuration based on a binary or higher choice of network architectures, which include at least two of a serial architecture, a distributed architecture, a partial mesh architecture, or a fully mesh architecture from which to select; and
cause an instantiation and an insertion of the user plane function device or the uplink classifier device according to a selected network architecture.

18. The non-transitory computer-readable storage medium of claim 17, wherein the instructions to evaluate comprise further instructions, which when executed, cause the processor to:
evaluate a location of an end device pertaining to the request, available user plane function devices or uplink classifier devices, and current loads associated with the available user plane function devices or uplink classifier devices.

19. The non-transitory computer-readable storage medium of claim 17, wherein the request includes a domain name system request or a session modification request.

20. The non-transitory computer-readable storage medium of claim 17, wherein the network device includes a session management function device of a core network.

* * * * *